Patented May 26, 1931

1,807,043

UNITED STATES PATENT OFFICE

CHARLES R. MABEE, OF VITTORIA, ONTARIO, CANADA, ASSIGNOR, BY MESNE ASSIGNMENTS, TO CHARLES H. DONALDSON, OF BUFFALO, NEW YORK

PREPARATION OF LIVESTOCK FEEDS

No Drawing. Application filed June 11, 1926. Serial No. 115,233.

This invention relates to a process for the manufacture of livestock feeds and to compositions adapted for use in accordance therewith, and includes correlated improvements and discoveries whereby there may be produced a material having a high feeding value.

This application is in part a continuation of my co-pending application Serial No. 38,565, filed June 20, 1925.

An object of the invention is to provide an improved process whereby farm roughage may readily and economically be converted into an appetizing, nourishing and easily digested feeding material.

Another object is to provide a composition adapted for use in the manufacture of livestock feeds whereby the flavor, food value and digestibility of farm roughage may be enhanced.

Other objects of the invention will in part be obvious and will in part appear hereinafter.

The invention accordingly comprises the several steps and the relation and order of one or more of such steps with respect to each of the others thereof, and a composition of matter possessing the characteristics, properties and relation of constituents, which will be hereinafter exemplified and the scope of the application of which will be indicated in the claims.

For a fuller understanding of the nature and objects of the invention reference should be had to the following detailed description exemplifying the invention.

It is often desired to employ farm roughage as a livestock feed because of the relatively low cost thereof and because of the health-giving constituents contained therein. The quantity of digestible nutrients in farm roughage, however, is, as a rule, comparatively small, and, accordingly, the present invention is directed to a process whereby the more complex components of the roughage may be converted easily and rapidly into materials which are readily assimilable by livestock.

In order to facilitate the storage and transportation of the roughage when it is to be utilized either at a time or place removed from the time or place of production, and to prevent the decay of the materials and the development of fungoid growths, it is preferable to dry the roughage and to maintain the same in a dry state up to the time of treatment.

The invention contemplates subjecting farm roughage, such as hay, threshed and unthreshed straws, clover, cornstalks and the like, to a treatment wherein inherent and/or added ferments are utilized in the presence of moisture to convert the same into a feeding material having an enhanced flavor, digestibility and nutritive value in the presence of one or more converter materials whereby the fermentative activity is accelerated and supplemental conversion of the roughage produced; and also the provision of a converter composition especially adapted to such treatment.

The converter may comprise one or more mineral substances, and preferably includes magnesia, lime, common salt and sulphur; however either or both of the last-mentioned ingredients may be omitted if desired, or either the magnesia or lime—preferably the former—may be used alone, or in combination with salt and/or sulphur. In certain instances, and especially when the particular roughage employed is low in inherent ferments, it is desirable also to add to the roughage one or more ferment-containing agents, such as diastatic malt, yeast, materials containing lactic bacilli, and fermented cereal products. The particular ferment-containing agent employed will depend upon the conditions in each particular case, as, for example, the type of roughage treated and the class of animals to be fed. It is often desirable, moreover, to include as a constituent of the converter a processed sweet clover.

In certain cases, moreover, there may be added to the roughage, besides the converter materials, one or more substances, such as calcium acid phosphate, ground rock phosphate, or ground bone-meal, whereby the body-building properties of the prepared feed may be increased so as to promote the growth of bone, cartilage, teeth, muscle, and the like in the animals fed, and in the case of poultry an increase in strength of the shells of the eggs produced.

Benzaldehyde, (the essential oil of bitter almonds) may also be added to the roughage in order to impart an improved flavor to the prepared feed as well as to promote digestion. This material not only magnifies the natural flavors of the roughage and counteracts unpleasant flavors and odors, giving to the feed a uniform flavor which possesses an appeal for domestic animals, but also serves to prevent putrefaction. In this connection it will be observed that several of the converter materials outlined above, for example, malt, yeast flour, and sodium chloride and calcium hydrate, as well as body-building materials, namely, the phosphates of calcium, and bone-meal, are well adapted to serve as vehicles for benzaldehyde when the same is to be transported or stored. Accordingly, benzaldehyde may be readily included in a converter composition prepared for subsequent use. It will be appreciated, however, that the benzaldehyde need not be introduced with the converter materials, but may be added to the roughage either before, during or after the conversion treatment. The proportion of benzaldehyde employed will, of course, depend upon the requirements in a particular case, but since a relatively small quantity of this material is sufficient to give the desired flavor to the feed, and inasmuch as benzaldehyde in a concentrated form has a pronounced antiseptic action, it is desirable that the quantity of benzaldehyde employed be sufficiently small when compared with the quantity of roughage treated so that the benzaldehyde will neither give too strong a flavor to the feed nor inhibit the action of the ferments inherent in the roughage or the ferments included in the converter.

As an exemplification of converter compositions, such as may be employed in accordance with the invention, mention may be made of the following:

Example 1

8 parts of magnesium hydrate;
6 parts of calcium hydrate;
70 parts of sodium chloride;
2 parts of sublimated sulphur.

Example 2

15 parts of a mixture of calcium and magnesium hydrates in substantially equal quantities;
70 parts sodium chloride;
2 parts sublimated sulphur;
10 parts of malt.

Example 3

20 parts of a mixture of calcium and magnesium hydrates substantially equal quantities;
48 parts of sodium chloride;
2 parts of sublimated sulphur;
15 parts of malt;
15 parts of calcium acid phosphate.

One part of processed sweet clover may be included in each of the foregoing compositions; and $\frac{1}{16}$th of one part of benzaldehyde may also be added.

It will be appreciated that the proportions of the various materials in the examples outlined above may be varied considerably in accordance with the requirements of the particular case. For example from 7 to 20 parts of the lime-magnesia component and from $\frac{1}{2}$ of 1 part to 3 parts of sulphur, and from 30 to 80 parts of common salt have been used with satisfactory results.

One part of a composition, such as exemplified above, ordinarily suffices for the treatment of approximately 80 parts of roughage.

While the invention is applicable to the treatment of coarse crops cut prior to maturity, it has been found that the best results are secured when the treatment is applied to roughage which has been allowed to ripen before cutting.

Preferably the roughage to be treated is comminuted as by clipping the same into short lengths. This is particularly desirable when the coarser type of roughage is employed. In the treatment of dry roughage it is desirable to add thereto sufficient water to moisten the same thoroughly without transforming it into a semi-liquid mass. This quantity may approximate the moisture content of green roughage and ordinarily will vary between one and two times the weight of the roughage, depending upon the type and comminution of the roughage and the degree of succulency desired. However, in certain cases the proportions may be varied beyond the figures given.

In the practice of the invention roughage is treated with the converter material or composition, which may be admixed with water in suitable proportions, and the admixture thus formed applied to the roughage. Preferably a quantity of the roughage to be treated is immersed in a bath of the admixture for a few minutes, allowed to drain, and deposited in a suitable container. As successive quantities of material are so deposited the mass may be packed suitably, as by being tramped upon. The roughage so prepared may then be subjected to the conversion reaction for a suitable period of time, ordinarily for from twelve to seventy-two hours, and preferably for from thirty-six to forty-eight hours when an unheated moistening medium is employed, during which time the temperature will usually have risen from 150° F. to 175° F., and the conversion reactions will have transformed the roughage into a feed having the desired assimilability, palatability and nutritive value.

The container employed is preferably in the shape of a tube open at both ends, such, for example, as exemplified in the patent to Charles R. Mabee, No. 1,585,931, dated May 25, 1926, (on the application Serial No. 38,439, filed June 20, 1925), or in the application of Charles R. Mabee, co-pending herewith, Serial No. 437,308, filed January 14, 1921, and the continuation thereof, Serial No. 49,236, filed August 10, 1925. Other types of container may be employed, however, or the container may be dispensed with entirely. For example, if it is desired to permit the ready access of air to the roughage during the treatment, there may be employed either a foraminate container, such as may be formed of wire mesh, as exemplified in the copending application Serial No. 115,232 of Charles R. Mabee, filed herewith, or a mass of roughage may be bound together in any other suitable manner as by the formation of bales.

It will be understood, of course, that the mode of procedure may vary from that set forth above. For example, the roughage may be packed in a container while in a dry state, and the admixture poured or sprayed thereon; the converter materials and the water may be applied to the roughage separately, warm water may be utilized; or, heat and/or additional pressure may be applied during the processing.

While the exact reactions set up by the use of the converter materials are not definitely known, it is believed that they serve to promote the fermentative activity perhaps directly, or it may be through an increase in the heat of the roughage under treatment and also to effect a change in the cellular structure or in the molecular composition of the roughage in such manner as to render the same more assimilable, nutritious and palatable.

The use of a converter, such as outlined above, renders possible the production of prepared roughage which may be used for feeding almost all types of domestic animals. For example, it has been used with excellent results in the feeding of horses, cattle, sheep, pigs, and poultry. The animals find the feed palatable and eat the same readily even when no flavoring agent is employed. The animals fed increase markedly in weight, and in the case of cows a milk yield of better quality results. At the same time the dry weight of the feed utilized may be reduced materially, the necessity of feeding grains avoided, and the feeding cost decreased correspondingly.

It will be appreciated that all proportions given herein are by weight.

Since certain changes in the above process and composition which embody the invention may be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure to Letters Patent, is:

1. In the art of producing an improved livestock feed by the fermentative conversion of farm roughage in a moist condition, the process which comprises subjecting the roughage to fermentative activity in the presence of a medium which beneficially influences the conversion of the roughage, said medium comprising an oxygen containing compound of magnesium.

2. In the art of producing an improved livestock feed by the fermentative conversion of farm roughage in a moist condition, the process which comprises subjecting the roughage to fermentative activity in the presence of a medium which beneficially influences the conversion of the roughage, said medium comprising magnesium hydrate.

3. In the art of producing an improved livestock feed by the fermentative conversion of farm roughage in a moist condition, the process which comprises subjecting the roughage to fermentative activity in the presence of a medium which beneficially influences the conversion of the roughage, said medium comprising magnesium hydrate and calcium hydrate.

4. In the art of producing an improved livestock feed by the fermentative conversion of farm roughage in a moist condition, the process which comprises subjecting the roughage to fermentative activity in the presence of a medium which beneficially influences the conversion of the roughage, said medium comprising magnesium hydrate, calcium hydrate and sodium chloride.

4. In the art of producing an improved livestock feed by the fermentative conversion of farm roughage in a moist condition, the process which comprises subjecting the roughage to fermentative activity in the presence of a medium which beneficially influences the conversion of the roughage, said medium comprising magnesium hydrate, calcium hydrate, sodium chloride and sulphur.

6. In the art of producing an improved livestock feed by the fermentative conversion of farm roughage in a moist condition, the process which comprises moistening a mass of dry, ripe, farm roughage with an unheated water admixture of a composition containing from 7 to 20 parts of a substance comprising substantial quantities of calcium hydrate and magnesium hydrate, from 30 to 80 parts of sodium chloride, and from one-half of 1 to 3 parts of sulphur, and subjecting the moistened roughage to fermentative activity for from approximately 36 to 48 hours.

7. In the art of producing an improved livestock feed by the fermentative conversion of farm roughage in a moist condition, the process which comprises moistening a mass of dry farm roughage with a water admixture of a composition containing magnesium hydrate, calcium hydrate, sodium chloride, sulphur and malt, and subjecting the moistened roughage to fermentative activity.

8. In the art of producing an improved livestock feed by the fermentative conversion of farm roughage in a moist condition, the process which comprises moistening about 8000 parts of farm roughage with a water admixture of a composition containing about 15 parts of a mixture of magnesium and calcium hydrates, about 70 parts of sodium chloride, about 2 parts of sulphur, and about 10 parts of malt, and subjecting the moistened roughage to fermentative activity.

9. In the art of producing an improved livestock feed by the fermentative conversion of farm roughage in a moist condition, the process which comprises subjecting the roughage to fermentative activity for from approximately 12 to 72 hours in the presence of diastase and of a medium which beneficially influences the conversion of the roughage, said medium comprising magnesium hydrate.

10. A composition for use in a process for the fermentative conversion of farm roughage, comprising magnesium hydrate, calcium hydrate, sodium chloride and sulphur.

11. In the art of producing an improved livestock feed by the fermentative conversion of farm roughage in a moist condition, the process which comprises subjecting the roughage to fermentative activity in the presence of a medium which beneficially influences the conversion of the roughage, said medium comprising a lime-magnesia component.

In testimony whereof I affix my signature.

CHARLES R. MABEE.